United States Patent
Sekiguchi et al.

(10) Patent No.: US 7,180,519 B2
(45) Date of Patent: Feb. 20, 2007

(54) IMAGE PROCESSING APPARATUS AND IMAGE PROCESS METHOD

(75) Inventors: Yumi Sekiguchi, Kanagawa (JP); Yukio Kumazawa, Kanagawa (JP); Masanori Onda, Kanagawa (JP); Youichi Isaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 50 days.

(21) Appl. No.: 10/384,685

(22) Filed: Mar. 11, 2003

(65) Prior Publication Data
US 2003/0179904 A1 Sep. 25, 2003

(30) Foreign Application Priority Data
Mar. 19, 2002 (JP) ............... 2002-076924

(51) Int. Cl.
*G06T 1/20* (2006.01)
*G06T 1/00* (2006.01)
*G06F 15/16* (2006.01)

(52) U.S. Cl. ............... 345/506; 345/501; 345/502
(58) Field of Classification Search ............... 345/506, 345/501, 502, 100; 382/100, 303; 348/84
See application file for complete search history.

(56) References Cited

U.S. PATENT DOCUMENTS

| | | | | |
|---|---|---|---|---|
| 4,749,990 A | * | 6/1988 | Birkner | 345/537 |
| 4,833,625 A | * | 5/1989 | Fisher et al. | 345/668 |
| 5,479,526 A | * | 12/1995 | Benton et al. | 382/103 |
| 5,706,415 A | * | 1/1998 | Kelley et al. | 345/426 |
| 6,252,610 B1 | * | 6/2001 | Hussain | 345/506 |
| 6,334,181 B1 | * | 12/2001 | Boutaud et al. | 712/38 |

FOREIGN PATENT DOCUMENTS

| | | |
|---|---|---|
| EP | 0 629 945 A2 | 12/1994 |
| JP | A 5-260373 | 10/1993 |
| JP | A 7-105020 | 4/1995 |

* cited by examiner

*Primary Examiner*—Ulka Chauhan
*Assistant Examiner*—Joni Hsu
(74) *Attorney, Agent, or Firm*—Oliff & Berridge, PLC

(57) ABSTRACT

In a pipeline process in which plural image processing sections (image processing modules), for example, an image inputting section 131, a histogram producing section 132, and a binarizing section 133 are connected in a pipeline manner, each of the image processing sections 131, 132, and 133 is provided with a function of reinitializing a state to cause each process to be again performed with being started from the beginning of an image, whereby image data to be processed can be reread.

9 Claims, 8 Drawing Sheets

IMAGE PROCESSING APPARATUS AND IMAGE PROCESS METHOD

BACKGROUND OF THE INVENTION

The present invention relates to an image processing apparatus and an image processing method which process digitized image data, and more particularly to an image processing apparatus and an image processing method in which plural component functional image processing modules are prepared and various image processing functions are realized by combining the modules.

A technique in which plural component functional image processing modules are prepared and various image processing functions are realized by combining the modules is used in many systems which handle a digital image, such as a document editor, a drawing tool, an image transmission apparatus, and a printer.

In a DTP (Desk Top Publishing) system into which an image can be input, a print system which can output an image, or the like, various image processes such as enlargement/reduction, rotation, affine transformation, color conversion, filter, and combination are performed on an image to be processed. When such a process is to be performed, the process is sometimes performed by using a dedicated hardware in the case where the attribute of an input image, the process contents, the procedure, parameters, and the like are fixed. In the case where various images of different color spaces or bit numbers per pixel are input, or where the process contents, the procedure, parameters, and the like are variously changed, however, such images or changes must be handled by a more flexible configuration.

As means which can satisfy such a requirement, conventionally, a technique is proposed in which programmable modules are connected in a pipeline manner or a DAG (Directed Acyclic Graph) manner, so that a desired process is flexibly performed (for example, see the Unexamined Japanese Patent Application Nos. Hei5-260373 and Hei7-105020).

The Unexamined Japanese Patent Application No. Hei5-260373 discloses a digital video signal processing apparatus which is configured so that contents of calculation processes of plural programmable calculation processing sections, and the connection manner of the programmable calculation processing sections through a network section can be set freely from the outside through a host controlling section, whereby a high-speed sophisticated calculation process is enabled, and the degree of freedom in change of a function or a system is made higher. The Unexamined Japanese Patent Application No. Hei7-105020 discloses a pipelined image processing system in which necessary functional modules are connected/initialized in pipeline manner in a desired sequence to perform a process, whereby the image processing can be flexibly performed.

In the technique disclosed in the Unexamined Japanese Patent Application No. Hei7-105020, a simulation system of a multiprocess pipeline by a single processor which is used in an operating system such as UNIX (registered trademark) is applied to an image processing field or the like. In image processing, particularly, when one process unit is restricted to a part of an image, for example, one line of an image, memory areas which are respectively held for processing by processing modules can be remarkably reduced.

As a result, an image processing apparatus which can implement a complex process with a reduced memory capacity, and which has a low production cost can be provided. When such an apparatus is operated on an operating system supporting virtual storage, swap-out due to an insufficient memory capacity is suppressed to a minimum level, and hence the apparatus can implement a process at a high speed.

In the case where an image processing apparatus which can perform a desired complex process as described above is configured by arbitrarily combining component functional modules, a very important function is reinitialization in which the state is returned to the initial state so that a predetermined process is again performed with being started from the beginning of image data to be processed. Many pipeline processes can be performed from beginning to end without activating reinitialization. However, reinitialization must be activated in a pipeline process such as described below.

As shown in FIG. 8, for example, a pipeline process includes an image inputting section 102, a histogram producing section 103, and a binarizing section 104. Digital image data supplied from an image storing section 101 is binarized, and the binarized data is supplied to an image outputting section. In the pipeline process, it is assumed that histogram data of an image to be processed is produced by the histogram producing section 103, a binarization threshold is determined with using the histogram data, and the binarizing section 104 performs a binarizing process based on the binarization threshold.

Since, in order to produce a histogram in the histogram producing section 103, all pixel values of the image to be processed are necessary, it is required to read image data of all lines and obtain information of all pixels. In the above-described pipeline process of the conventional art, either of the following two systems may be employed in order to realize a process of reading image data of all lines and obtaining information of all pixels.

In the first one of the systems, as shown in FIG. 9, separate pipelines, or a pipeline 200A which produces histogram data, and a pipeline 200B which performs a binarizing process on the basis of the produced histogram data. Assuming a case where this system is realized as a process program module on a computer, the image inputting section 102 is twice produced, and the initializing process in the image inputting section 102 is twice performed. Therefore, the resource and the processing speed are wasted.

In the second system, the histogram producing section 103 in the single pipeline shown in FIG. 8 is configured as shown in FIG. 10. Specifically, the histogram producing section 103 is configured so as to have an input buffer 301 which holds all lines of image data supplied from a preceding module, an output buffer 302 which outputs a process result to a module in a succeeding stage, and a histogram production controller 303 which controls the histogram producing process.

Assuming a case where this system is realized as a process program module on a computer, in the histogram producing section 103, all image data which are supplied form the preceding module in initialization are first stored into the input buffer 301. Next, the histogram production controller 303 produces histogram data with using the all image data stored in the input buffer 301, and initializes (=1) a line counter which is internally held. When the output buffer 302 is transferred from the succeeding module and an output request is received, the histogram production controller 303 copies the image data held in the input buffer 301, into the output buffer 302 by unit of line, returns the output buffer 302 to the succeeding stage, and then increments the line counter by 1.

In the second system, although conversion of image data is not performed at all in the histogram producing process of the histogram producing section 103, it is required to hold all of input image data. Therefore, a buffer having a memory capacity by which all image data can be stored is necessary as the input buffer 301. As a result, the resource is largely wasted.

SUMMARY OF THE INVENTION

The invention is conducted in view of the problems discussed above. It is an object of the invention to provide an image processing apparatus and an image processing method in which, when various image processing functions are realized by arbitrarily combining plural component functional image processing modules, image data to be processed can be reread.

In order to attain the object, according to the invention, in an image processing apparatus in which plural image processing sections (image processing modules) that perform respective predetermined processes are connected in a pipeline manner, each of the image processing sections (image processing modules) is provided with a reinitializing function. In this specification, reinitialization means a process of returning a state to the initial state so as to cause the predetermined process to be again performed with being started from the beginning of image data to be processed.

In a pipeline process, since each of the image processing sections (image processing modules) is provided with a reinitializing function, image data to be processed can be reread. In the case where a process such as that in which a result of analysis of image data is used in a process of a succeeding stage is realized in the form of a program on a computer, therefore, the process which is performed by plural passes in the conventional art can be performed by one pass. As a result, the programming efficiency is enhanced, and initialization overhead does not occur, so that the process can be lightened.

DETAILED DESCRIPTION OF THE PREFERRED EMBODIMENTS

Hereinafter, an embodiment of the invention will be described in detail with reference to the accompanying drawings.

Figure 1:
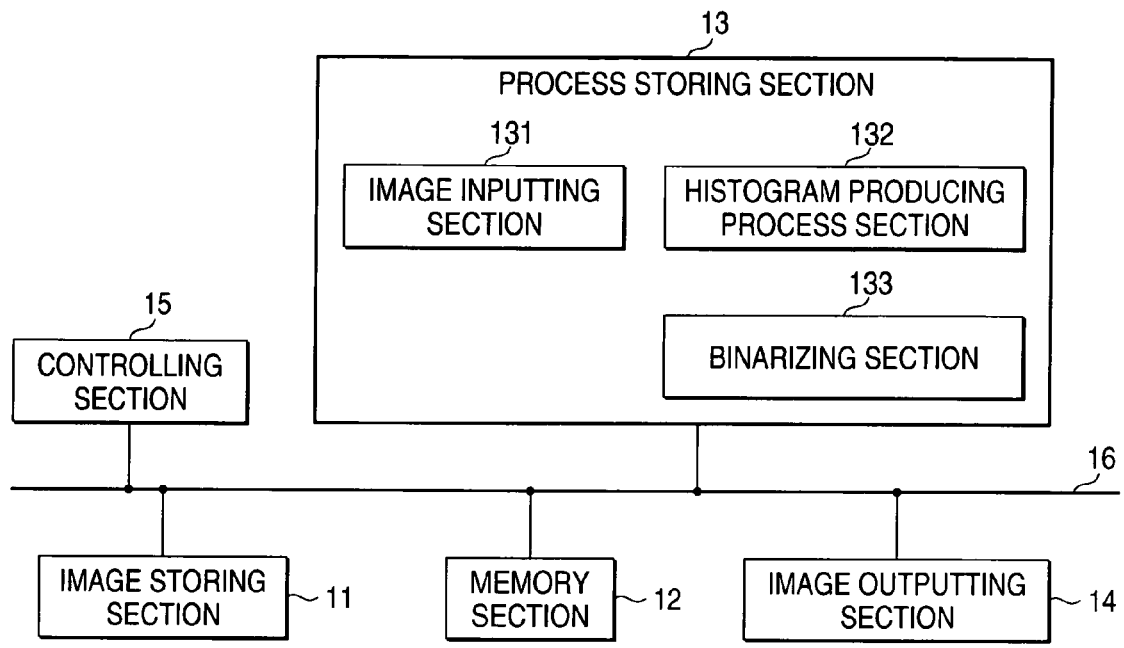
FIG. 1 is a block diagram showing an example of the configuration of an image processing apparatus which is an embodiment of the invention.
Figure 2:
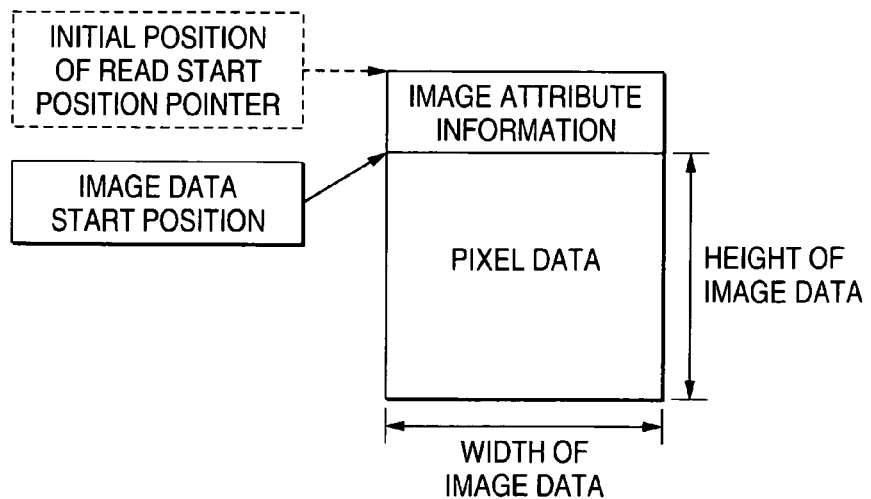
FIG. 2 is a diagram schematically showing the structure of image data which is to be processed by the image processing apparatus of the embodiment.

FIG. 1 is a block diagram showing an example of the configuration of an image processing apparatus (system) which is an embodiment of the invention. As seen from FIG. 1, the image processing apparatus of the embodiment has an image storing section 11, a memory section 12, a process storing section 13, an image outputting section 14, and a controlling section 15. These components are interconnected to one another via a bus line 16. FIG. 2 schematically shows the structure of image data which is to be processed by the image processing apparatus.

Referring to FIG. 1, the image storing section 11 holds digitized image data to be processed. The memory section 12 holds a processing region required for the image data held in the image storing section 11, and various processes, intermediate results of various calculations, process parameters, etc. The image storing section 11 may serve also as the memory section 12.

The process storing section 13 has various image processing sections which perform predetermined processes on the image data to be processed which is held in the image storing section 11, such as an image inputting section 131, a histogram producing process section 132, and a binarizing section 133. The various image processing sections in the process storing section 13 may operate with being deployed as program modules in the memory section 12, or may be partly or wholly configured by dedicated hardware. The various image processing sections in the process storing section 13 will be described later in detail.

The image outputting section 14 outputs process results which are obtained by processing image data held in the image storing section 11 by the various image processing sections in the process storing section 13, via the bus line 16 to the outside of the illustrated system. The controlling section 15 is configured by a CPU and the like, and controls the processes in the image storing section 11, the memory section 12, the process storing section 13, and the image outputting section 14.

Next, the various image processing sections constituting the process storing section 13 will be outlined by exemplifying several processes.

As described above, the various image processing sections may exist as process program modules on a computer, or may be partly or wholly configured by dedicated hardware. Hereinafter, in order to simplify the description, the case where the sections are realized as process program modules on a computer will be described as an example.

Figure 3:
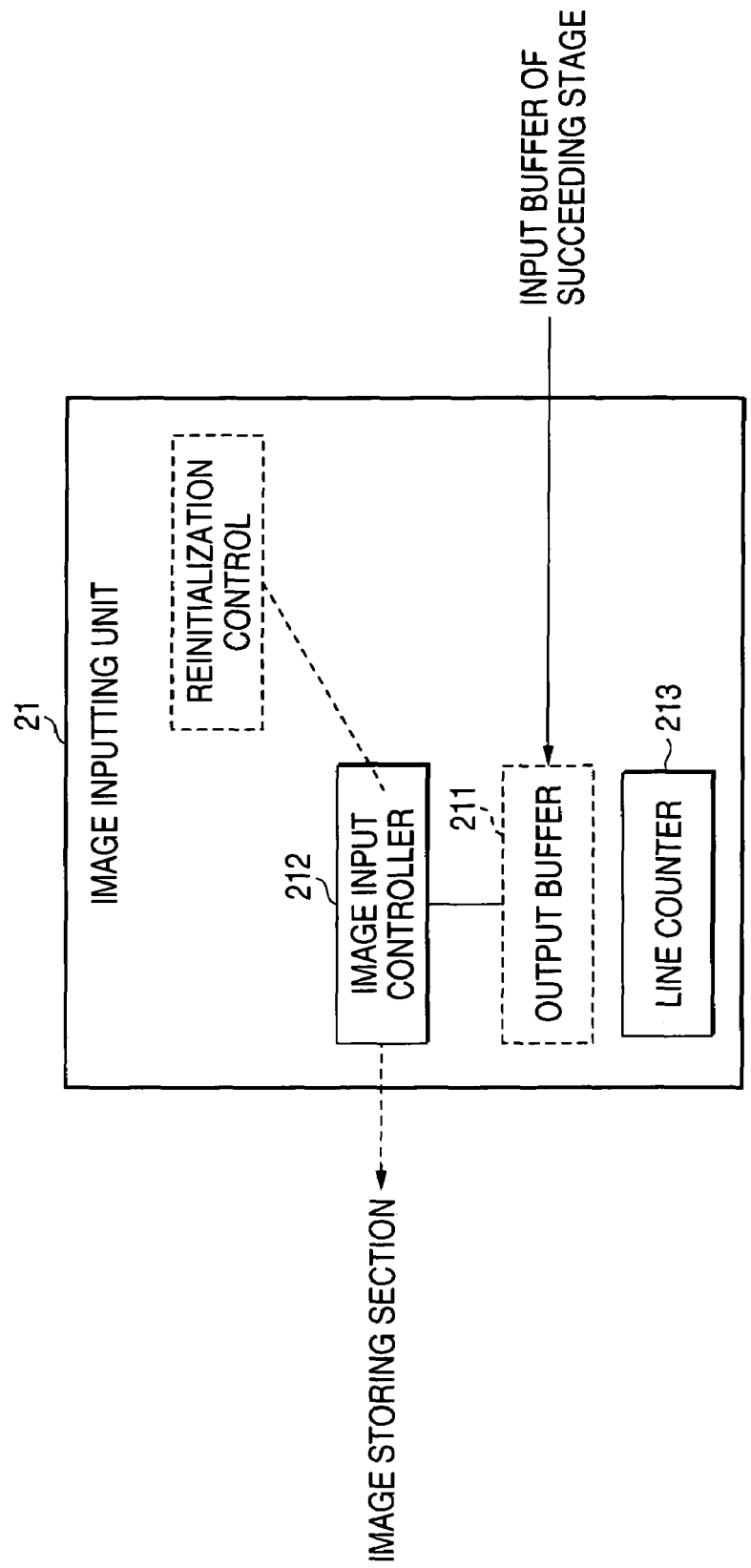
FIG. 3 is a block diagram showing an example of the configuration of an image inputting unit.

FIG. 3 is a block diagram showing an example of the configuration of an image inputting unit 21 into which image data to be processed is to be input. The image inputting unit 21 corresponds to the image inputting section 131 in FIG. 1.

The image inputting unit 21 has: an output buffer 211 which is used for reading image data, and outputting the image data to a succeeding module; an image input controller 212 which controls a process of inputting the image data; and a line counter 213 which counts the number of lines. In this example, the image inputting unit 21 has the line counter 213. If such a counter is not necessary, the line counter 213 may be omitted.

Referring to FIG. 1, in a process of producing a module, the controlling section 15 designates image data held in the image storing section 11, necessary information and the like are fetched out from the process storing section 13, and the image inputting unit 21 is produced as a program module in the memory section 12. In the production, image attribute information such as the size of the image data, the bit number, and the color space are obtained, the obtained image attribute information is stored into the memory section 12, and, as shown in FIG. 2, a read start position pointer is advanced to the image data start position where pixel data is stored, and the line counter 213 is initialized.

When the output buffer 211 is transferred from the succeeding module and an output request is received, the image input controller 212 sequentially reads out pixel data corresponding to the size of the output buffer, with starting from the address indicated by the read start position pointer, stores the pixel data into the output buffer 211, and then increments the line counter 213 by 1.

The image input controller 212 performs a control also in the case where the controller receives from a succeeding module instructions for reinitialization to return the state of the process of the image inputting unit 21 to the initial state so that the process is again performed with being started from the beginning of the image data to be processed. Namely, when the image input controller 212 receives reinitialization instructions from the succeeding module, the controller moves the read start position pointer to the image data start position, and initializes the line counter 213.

Figure 4:
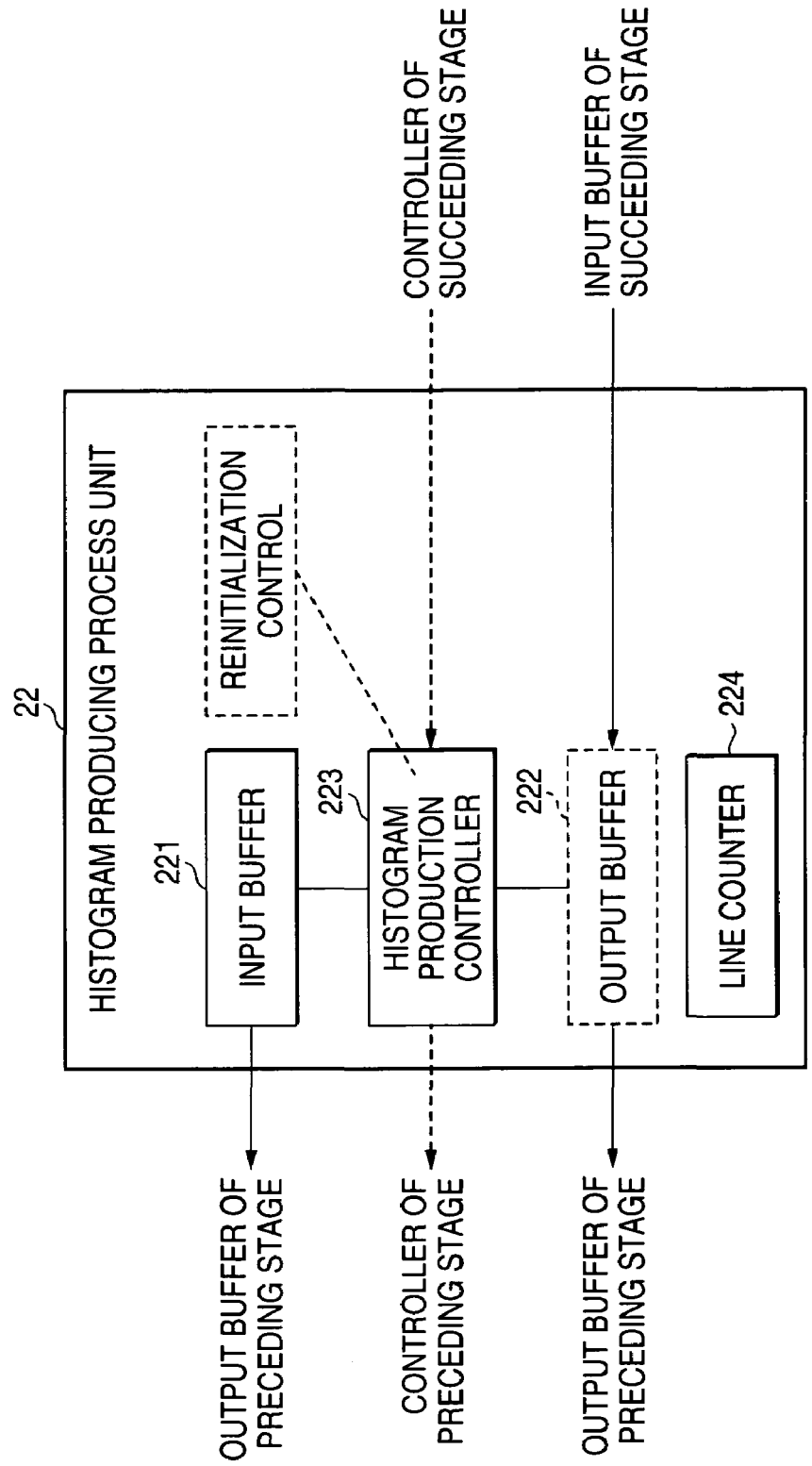
FIG. 4 is a block diagram showing an example of the configuration of a histogram producing process unit.

FIG. 4 is a block diagram showing an example of the configuration of a histogram producing process unit 22 which performs a process of producing a histogram of image data. The histogram producing process unit 22 corresponds to the histogram producing process section 132 in FIG. 1.

The histogram producing process unit 22 has: an input buffer 221 which temporarily stores image data supplied from a preceding module; an output buffer 222 which outputs the image data to a succeeding module; a histogram production controller 223 which controls a histogram producing process; and a line counter 224 which counts the number of lines.

Referring to FIG. 1, in the process of producing a module, the controlling section 15 designates an address where histogram data is to be stored in the memory section 12, necessary information and the like are fetched out from the process storing section 13, and the histogram producing process unit 22 is produced as a program module in the memory section 12. In the production, the histogram production controller 223 is provided with information of connection to the preceding module, from the controlling section 15, issues a request for obtaining attribute information of input image data, to the preceding module on the basis of the information, and obtains image attribute information such as the size of the image data and the bit number. The input buffer 221 which is necessary for a process is formed in the memory section 12, and the line counter 224 is initialized.

The histogram producing process unit 22 further repeats the following process until the value of the line counter 224 is equal to the height (total line number) of the input image data, thereby producing a histogram. In the process, the input buffer 221 is transferred to the preceding module to request the output, histogram data is counted on the basis of values of image data stored in the input buffer 221 which is returned from the preceding stage, and the line counter 224 is incremented by 1.

When the production of histogram data is ended, the histogram production controller 223 releases the input buffer 221, and initializes the line counter 224.

When the output buffer 222 is transferred from the succeeding module and an output request is received for the first time, the histogram production controller 223 gives instructions for reinitialization to the preceding module, then transfers the output buffer 222 to the preceding module to give an output request, and returns a result of the request as it is to the succeeding module. When the output request is received from the succeeding module for the second and subsequent times, the histogram production controller transfers the output buffer 222 to the preceding module and gives an output request, and returns a result of the request as it is to the succeeding module.

In the thus configured histogram producing process unit 22, when an output request is received for the first time from the succeeding module, the histogram production controller 223 gives reinitialization instructions to the preceding module. Alternatively, regardless of whether an output request from the succeeding module is received or not, reinitialization instructions may be given to the preceding module after histogram data is produced in the module producing process.

When the histogram production controller 223 receives reinitialization instructions from the succeeding module, the controller controls also the process of sending reinitialization instructions to the preceding module. Specifically, when reinitialization instructions are given to the histogram producing process unit 22 from the succeeding module, the histogram production controller 223 gives reinitialization instructions to the preceding module.

Figure 5:
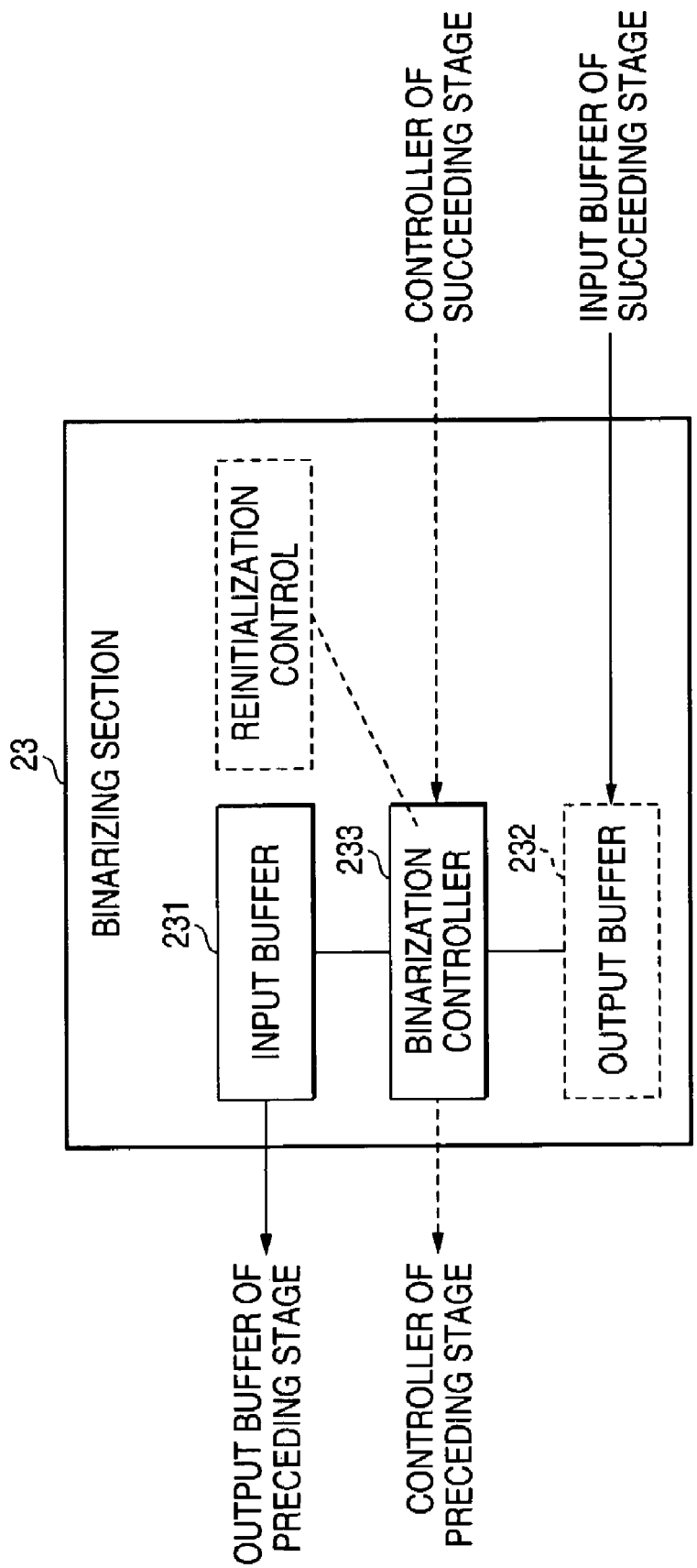
FIG. 5 is a block diagram showing an example of the configuration of a binarizing section.

FIG. 5 is a block diagram showing an example of the configuration of a binarizing section 23 which determines a binarization threshold with using the histogram data produced by the histogram producing process unit 22 shown in FIG. 4, and which performs a binarizing process. The binarizing section 23 corresponds to the binarizing section 133 in FIG. 1.

The binarizing section 23 has: an input buffer 231 which holds image data supplied from the previous module; an output buffer 232 which is used for outputting a process result to the succeeding module; and a binarization controller 233 which controls a binarizing process.

Referring to FIG. 1, in a process of producing a module, in order to produce the binarization threshold, the binarizing section 23 receives from the controlling section 15 the histogram data produced by the histogram producing process section 132 (the histogram producing process unit 22), information and the like for processing the data are fetched out from the process storing section 13, and the binarizing section 23 is produced as a program module in the memory section 12.

In the production, the binarization controller 233 is provided with information of connection to the preceding module, from the controlling section 15, issues a request for obtaining attribute information of input image data, to the preceding module on the basis of the provided information, obtains image attribute information such as the size of the image data and the bit number, and produces a necessary input buffer 702 in the memory section 12. The binarization threshold is determined on the basis of the histogram data by a predetermined method. Any method may be selected as the method of determining the binarization threshold on the basis of the histogram data.

When the output buffer 232 is transferred from the succeeding module and an output request is received, the binarization controller 233 transfers the input buffer 231 to the preceding module and gives an output request, then performs a binarizing process on image data stored in the input buffer 231 with using the binarization threshold, stores a result of the process into the output buffer 232, and returns the output buffer to the succeeding module.

The binarization controller 233 performs a control also in the case where the controller receives reinitialization instructions from the succeeding module, and in the case where reinitialization instructions are to be sent to the preceding module. Namely, when received reinitialization instructions from the succeeding module, the binarization controller 233 gives reinitialization instructions to the preceding module.

In the above, each of the various image processing sections (image processing modules), i.e., the image inputting unit 21, the histogram producing process unit 22, and the binarizing section 23 is outlined.

Figure 6:
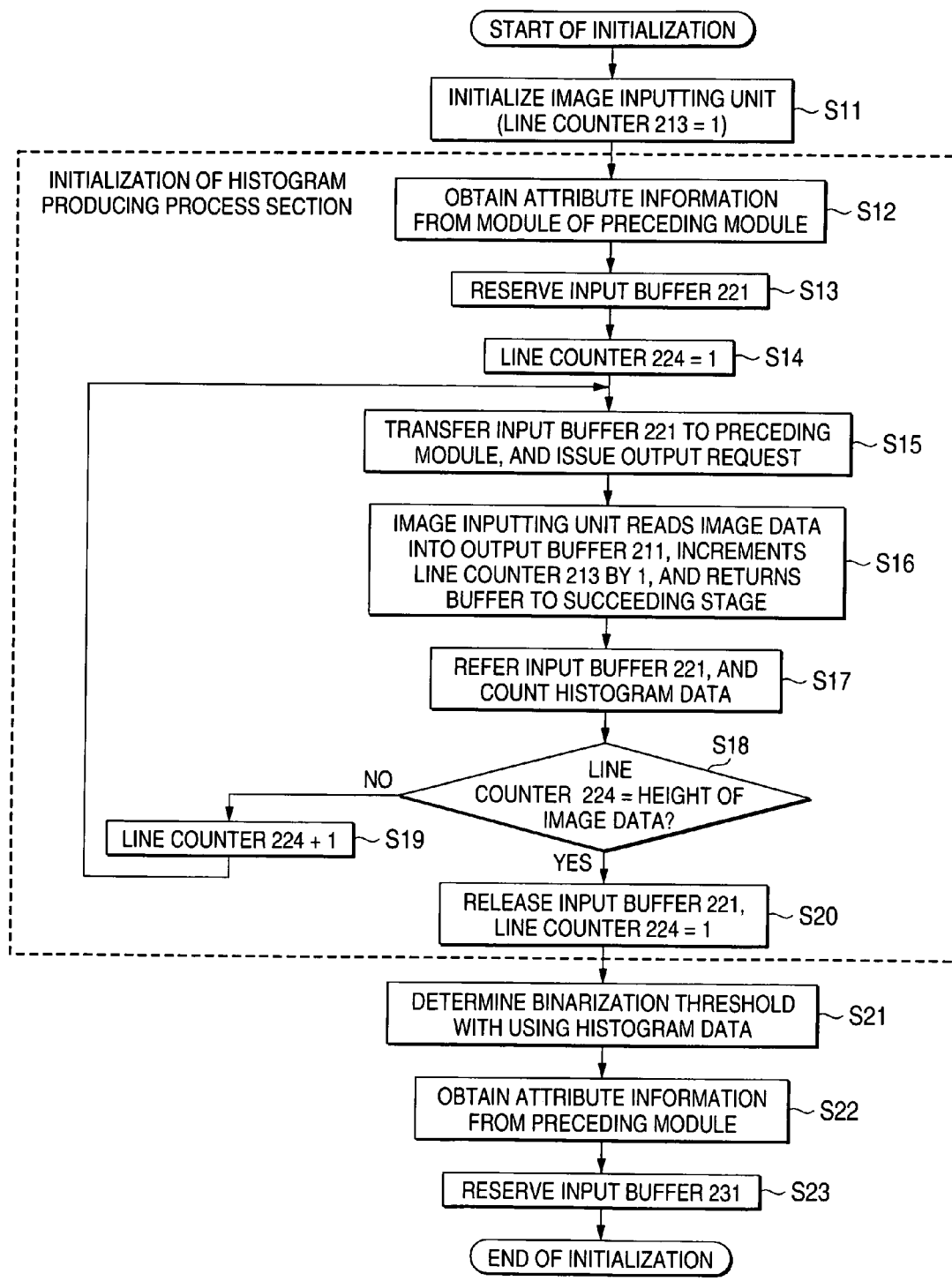
FIG. 6 is a flowchart showing the operation of initialization of image processing.
Figure 7:
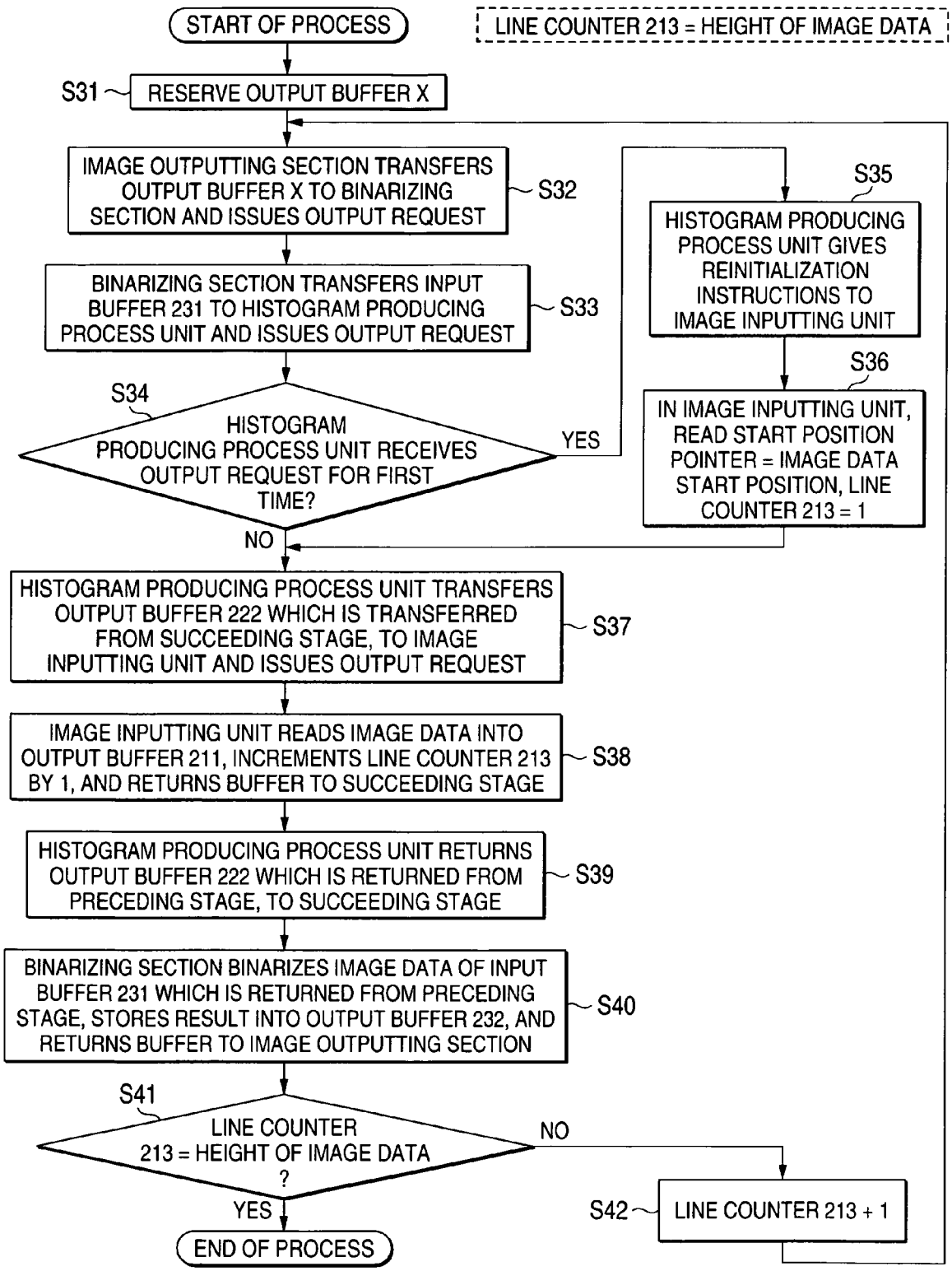
FIG. 7 is a flowchart showing the operation of an implementation of the image processing.
Figure 8:
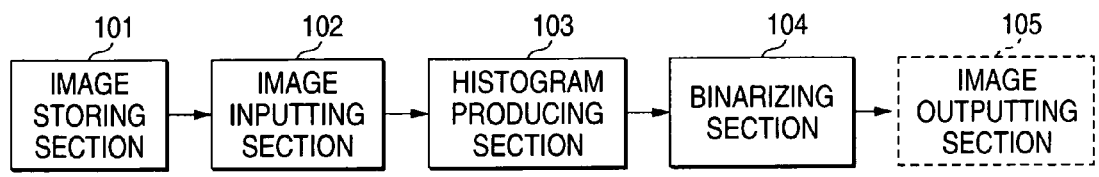
FIG. 8 is a block diagram showing an example of a combination of image processing modules.
Figure 9:
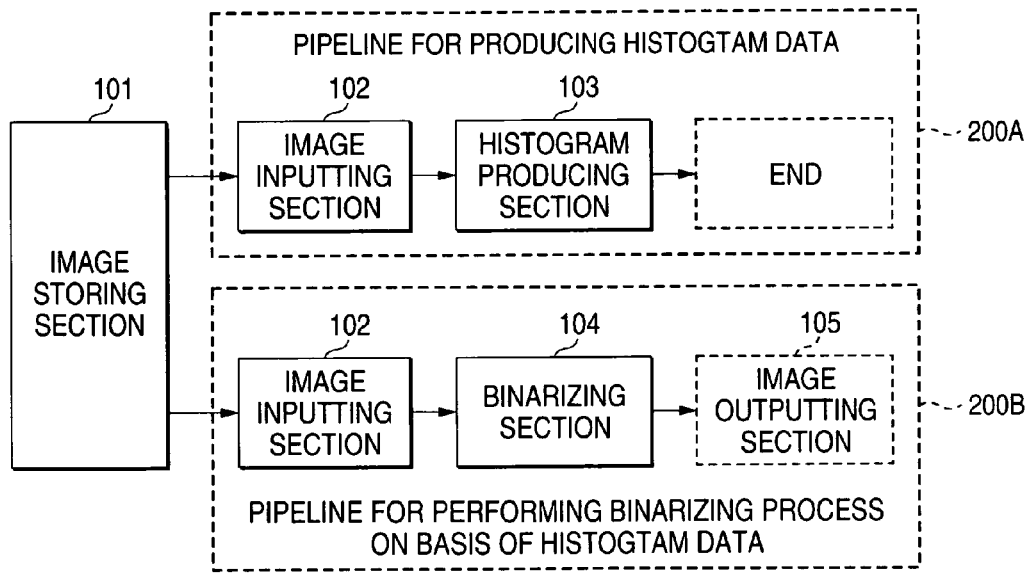
FIG. 9 is a block diagram showing an example of the case where the same process as that of FIG. 8 is realized without using a reinitializing function.
Figure 10:
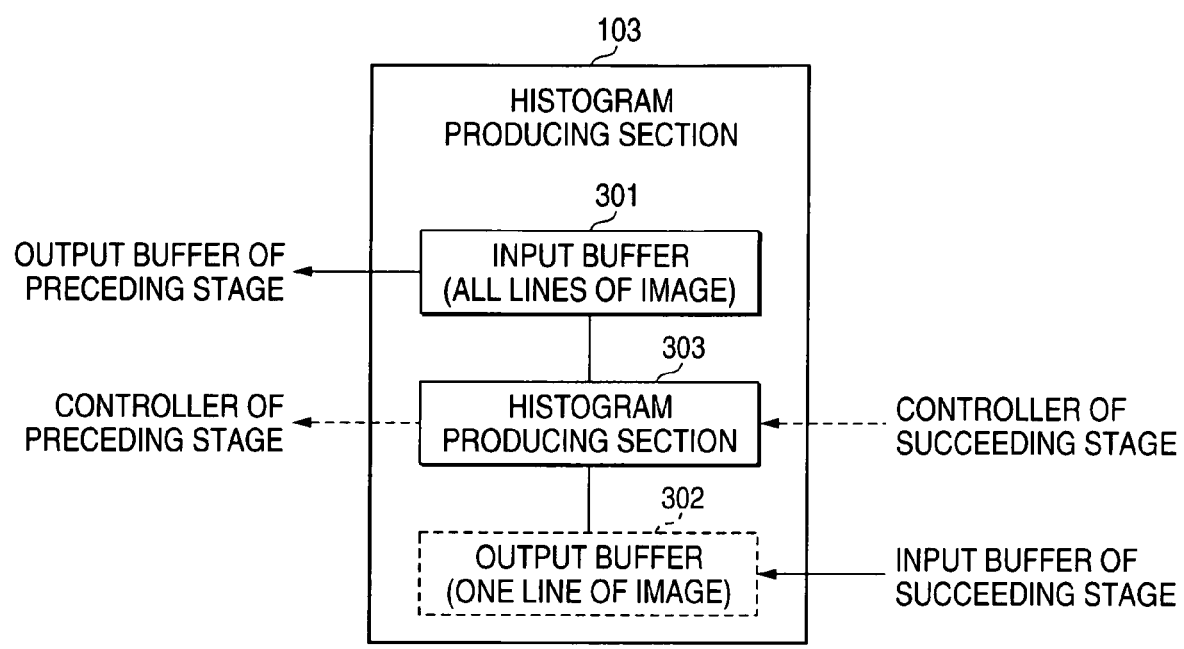
FIG. 10 is a block diagram showing an example of the configuration of a histogram producing section in the case where the same process as that of FIG. 8 is realized without using a reinitializing function.

Hereinafter, the operation in the case where the process of the block diagram of FIG. 8, or the pipeline process in which the image processing modules of the image input, the histogram producing process, and the binarizing process are connected in a pipeline manner is implemented in the image processing apparatus shown in FIG. 1 will be described in detail with reference to flowcharts of FIGS. 6 and 7. FIG. 6 is a flowchart of initialization of the image processing, and FIG. 7 is a flowchart of an implementation of the image processing after the image process initialization.

First, the operation of initialization will be described with reference to the flowchart of FIG. 6. The image inputting unit 21 is first initialized (step S11). Specifically, attribute information (the image size, the color space information, and the like) of the input image data to be processed is obtained, the read start position pointer (see FIG. 2) is moved to the image data start position, and the line counter 213 is initialized. When initialization of the image inputting unit 21 is ended, the operation of the histogram producing process unit 22 is started.

In the histogram producing process unit 22, first, attribute information of input image data is obtained from the information of connection to the preceding module (the image inputting unit 21) (step S12), and the input buffer 221 is reserved (step S13). At this time, the input buffer 221 is requested only to be reserved so that one line of the input image data can be stored.

Next, the line counter 224 is initialized (step S14). The input buffer 221 is transferred to the preceding module (the image inputting unit 21), and the output request is issued (step S15). In the image inputting unit 21, then, image data is read into the output buffer 211 (=the input buffer 221) which is transferred from the succeeding module (the histogram producing process unit 22), the line counter 213 is incremented by 1, and the buffer is returned to the succeeding module (step S16).

In the histogram producing process unit 22, thereafter, the image data stored in the input buffer 221 is referred, histogram data is counted (step S17), and it is judged whether the count value of the line counter 224 reaches the height (total line number) of the image data or not (step S18). If the value of the line counter 224 does not reach the height of the input image data, the line counter 224 is incremented by 1 (step S19), and the control then returns to step S15 to repeat the processes of steps S15 to S18. If the value of the line counter 224 is equal to the height of the input image data, the input buffer 221 is released, and the line counter 224 is initialized (step S20).

Next, the operation of the binarizing section 23 is started. In the binarizing section 23, first, the binarization threshold is obtained on the basis of the produced histogram data (step S21). Any method may be selected as the method of determining the binarization threshold on the basis of the histogram data. In the binarizing section 23, thereafter, attribute information of the input image data is obtained from information of connection to the preceding module (the histogram producing process unit 22) (step S22), and the input buffer 231 is reserved (step S23). As a result of the above series of processes, the initialization is ended.

In the flowchart shown in FIG. 6, the processes in the binarizing section 23 are performed in the sequence of step S21→step S22. If image attribute information is not necessary in determination of the binarization threshold, the sequence may be changed so that the processes are performed in the sequence of, for example, step S22→step S23→step S21.

Next, the operation of the implementation of the image processing after the image process initialization will be described with reference to the flowchart of FIG. 7. After the image process initialization is ended, the line counter 213 of the image inputting unit 21 is in the state where the value is equal to the height of the image data.

First, the image outputting section 14 previously obtains attribute information of an image to be output, and reserves an output buffer which can store one line of the image to be output (for the sake of convenience, hereinafter, the buffer is referred to as output buffer X) (step S31). Thereafter, the image outputting section 14 transfers the output buffer X to the preceding module (the binarizing section 23), and issues an output request (step S32). In response to the output request, the binarizing section 23 transfers the input buffer 231 to the preceding module (the histogram producing process unit 22), and issues an output request (step S33).

Thereafter, it is judged whether the histogram producing process unit 22 receives the output request from the succeeding module for the first time or not (step S34). If the unit receives the output request for the first time, the histogram producing process unit 22 gives reinitialization instructions to the preceding module (the image inputting unit 21) (step S35). When the image inputting unit 21 receives the reinitialization instructions from the succeeding module (the histogram producing process unit 22), the unit moves the read start position pointer shown in FIG. 2 to the image data start position, and initializes the line counter 213 (step S36).

The reinitializing process in steps S35 and S36 is a characteristic portion of the invention. In the embodiment, the reinitializing process is performed in the middle of the implementation of the image processing after initialization. Alternatively, the reinitializing process may be implemented at the timing when the initializing process of the flowchart of FIG. 6 is ended.

After the reinitializing process, or if the reception of the output request from the succeeding module by the histogram producing process unit 22 is not the first time, the histogram producing process unit 22 transfers the output buffer 222 which is transferred from the succeeding module (the binarizing section 23), to the preceding module (the image inputting unit 21), and issues an output request (step S37). In the image inputting unit 21, image data is read into the output buffer 211 (=the output buffer 222) which is transferred from the succeeding module (the histogram producing process unit 22), the line counter 213 is incremented by 1, and the buffer is returned to the succeeding stage (step S38). The histogram producing process unit 22 returns the output buffer 222 which is returned from the preceding module (the image inputting unit 21), to the succeeding stage (step S39).

The binarizing section 23 binarizes image data stored in the input buffer 231 (=the output buffer 222) which is returned from the preceding module (the histogram producing process unit 22), stores a result of the process into the output buffer 232 (=the output buffer X), and returns the buffer to the succeeding module (the image outputting section 14) (step S40).

Next, it is judged whether the count value of the line counter 213 is equal to the height of the input image data or not (step S41). If the value does not reach the height of the image data, the line counter 213 is incremented by 1 (step S41), and the control then returns to step S32 to repeat the processes of steps S32 to S41. If the value of the line counter 213 is equal to the height of the input image data, the above-described series of processes is ended.

As described above, in a pipeline process in which plural image processing sections (image processing modules) that perform respective predetermined processes are connected in a pipeline manner, each of the image processing sections is provided with the reinitializing function. Even in the case where an image attribute, for example, histogram data is obtained with using all pixel values of image data and thereafter a succeeding stage performs a process using the obtained histogram data, therefore, desired image processing can be performed without holding the whole image data in a buffer or conducting several times an initializing process.

In the embodiment described above, the invention is applied to a pipeline process in which the image inputting unit 21, the histogram producing process unit 22, and the binarizing section 23 are connected as image processing sections in a pipeline manner. However, the invention is not restricted to the application example, and can be applied to all pipeline processes including image processing sections (image processing modules) which perform a process of obtaining an image attribute such as a projected distribution with using all pixel values of image data to be processed.

As described above, according to the invention, when plural component functional image processing modules are arbitrarily combined to implement various image processing functions, each of the image processing sections is provided with a reinitializing function, whereby image data to be processed can be reread. In the case where a process such as that in which a result of analysis of image data is used in a process of a succeeding stage is realized in the form of a program on a computer, therefore, the process which is performed by plural passes in the conventional art can be performed by one pass. As a result, the programming efficiency is enhanced, and initialization overhead does not occur, so that the process can be lightened.

What is claimed is:

1. An image processing apparatus comprising:
a plurality of image processing sections which are connected in a pipeline manner, and which perform respective predetermined processes, wherein each of said image processing sections has a reinitialization control that receives a reinitialization instruction from a succeeding image processing section and performs based on the reinitialization instruction a function of reinitializing a state to cause a predetermined process to be again performed with being started from a beginning of image data to be processed.

2. The image processing apparatus according to claim 1, wherein each of said image processing sections has another function of transferring reinitialization instructions to other connected image processing sections, in addition to the reinitializing function.

3. The image processing apparatus according to claim 2, wherein each of said image processing sections has the other function of transferring the reinitialization instruction to a preceding image processing section connected thereto.

4. The image processing apparatus according to claim 1, wherein at least one of said image processing sections performs a predetermined process with using all pixel values of the image data to be processed.

5. The image processing apparatus according to claim 4, wherein the predetermined process is a process of obtaining an image attribute.

6. The image processing apparatus according to claim 5, wherein the image attribute is a histogram of the image to be processed.

7. The image processing apparatus according to claim 1, wherein the plurality of image processing sections includes an image inputting section that that inputs the image data to be processed, a histogram producing process section that performs a process of producing a histogram of the image data, and a binarizing section that performs a binarization process using the image data produced by the histogram producing process section.

8. An image processing method in a pipeline process, comprising:
performing respective predetermined processes by a plurality of image processing modules connected in a pipeline manner,
by a reinitialization control in each of said image processing modules, performing a function of reinitializing a state of the respective image processing modules to cause a predetermined process to be again performed with being started from a beginning of image data to be processed, based on a reinitialization instruction received by each of said image processing modules from a succeeding image processing module; and
outputting the image data processed by the reinitialized image processing modules.

9. The image processing method according to claim 8, further comprising:
transferring the reinitialization instruction from each image processing module to a preceding image processing module connected thereto.

* * * * *